Feb. 23, 1937.  V. L. MILLER  2,071,647
SHAPED RUBBER SPONGE
Filed Jan. 2, 1934   3 Sheets-Sheet 1
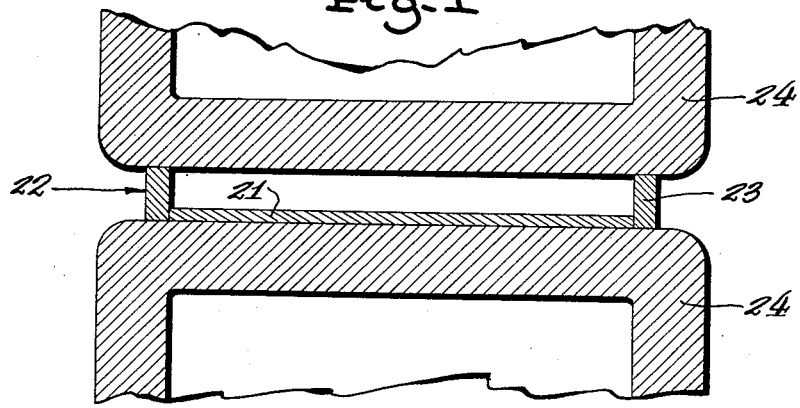
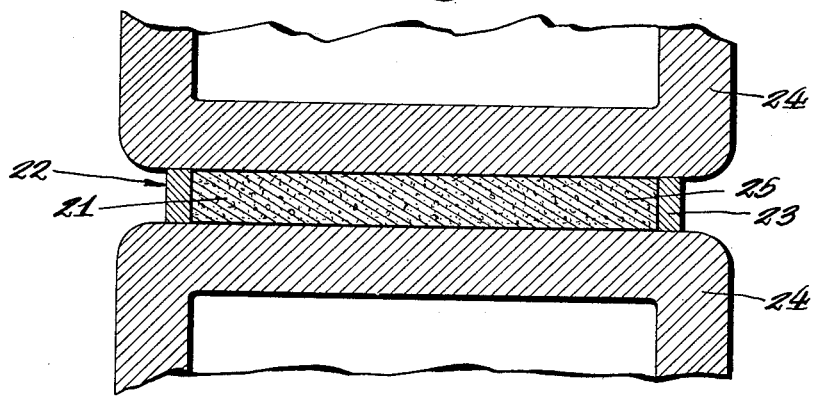
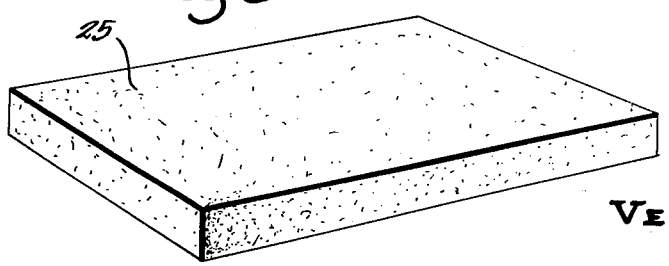
Vernon L. Miller
INVENTOR
ATTORNEYS Feb. 23, 1937. V. L. MILLER 2,071,647
SHAPED RUBBER SPONGE
Filed Jan. 2, 1934 3 Sheets-Sheet 2

VERNON L. MILLER
INVENTOR
BY Freeman and Weidman
ATTORNEYS

Feb. 23, 1937.                V. L. MILLER                  2,071,647
                           SHAPED RUBBER SPONGE
                           Filed Jan. 2, 1934          3 Sheets-Sheet 3

VERNON L. MILLER
INVENTOR
By Freeman & Weidman
ATTORNEYS

Patented Feb. 23, 1937

2,071,647

UNITED STATES PATENT OFFICE 2,071,647

SHAPED RUBBER SPONGE

Vernon L. Miller, Ashland, Ohio, assignor to The Faultless Rubber Company, Ashland, Ohio, a corporation of Ohio Application January 2, 1934, Serial No. 704,827

8 Claims. (Cl. 18—47.5)

My invention relates to shaped rubber sponge, and to a process for making the same, and aims to provide a new and improved process, and a new and improved product.

The drawings accompanying this specification, and forming part of this application, serve to augment this specification in illustrating certain forms which my invention may assume, and in these drawings:

Figures 1 and 2 are views illustrating the formation of a rubber sponge slab,

Figure 3 is a view of the slab so produced,

Figure 4:
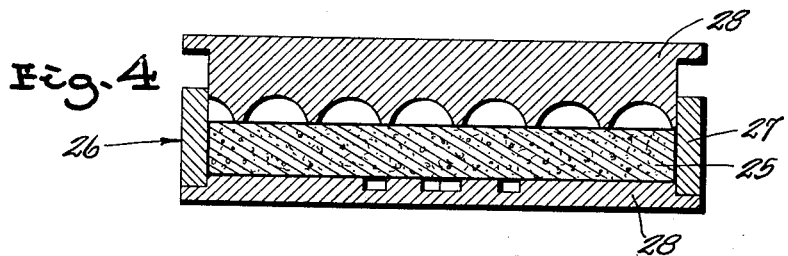
Figure 4 is a view illustrating a mold used in a further operation.

According to one embodiment of my invention, I form a suitable vulcanizable rubber sponge dough, containing both one or more agents for expanding the dough into sponge and one or more agents for effecting vulcanization of the rubber, and I roll this dough into a relatively thin strip, and cut this strip into sheets of desired size, all as is well known in the art.

Next I introduce one of the sheets 21 into a mold 22, the sides of which are constituted by a rectangular frame 23, and the faces of which are constituted by press platens 24, as shown in Figure 1.

The heat from the platens 24 causes the expanding agents to expand the sheet 21 into a cellular sponge, and concurrently, causes the vulcanizing agents to begin the vulcanization of the rubber.

According to the particular form of my invention that I am now describing, I continue this process until the expanding agents have expanded the dough sheet 21 into a sponge slab 25, completely filling the mold 22, as shown in Figure 2, and have escaped, and until the vulcanizing agents have carried the vulcanization to a point where the slab 25 will maintain its form.

Thereafter I open the mold 22, and remove therefrom the sponge slab 25, shown in Figure 3.

Figure 5:
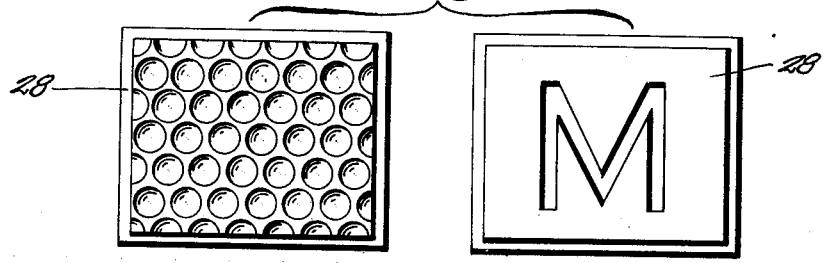
Figure 5 is a detail of the plates employed in the operation of Figure 4.

According to the present form of my invention I next place the slab 25 in a mold 26, shown in Figure 4, the sides of which are constituted by a rectangular frame 27, similar to the frame 23 of the mold 22, but the faces of which are constituted by plates 28, the inner surfaces of which are configured to shape the faces of the slab 25 in the desired design, as shown in Figure 5.

Figure 6:
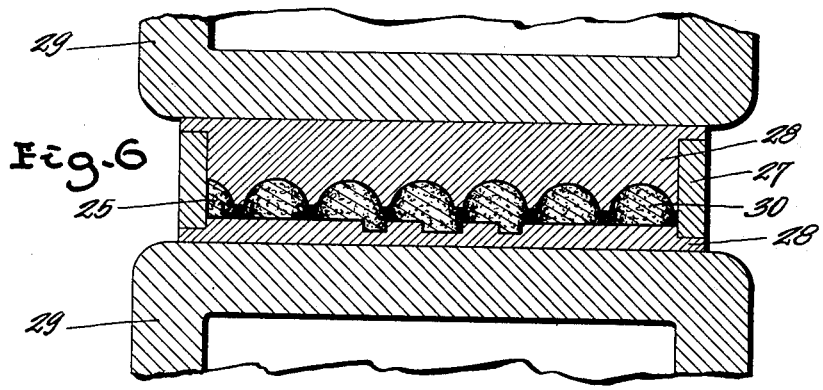
Figure 6 is a view illustrating the further operation.

Thereupon I place the mold 26, containing the slab 25, between press platens 29, and advance the platens 29 until the mold plates 28 are seated on the mold frame 27, as shown in Figure 6, and the slab 25 is selectively compressed, according to the configuration of the faces of the mold plates 28.

Figure 7:
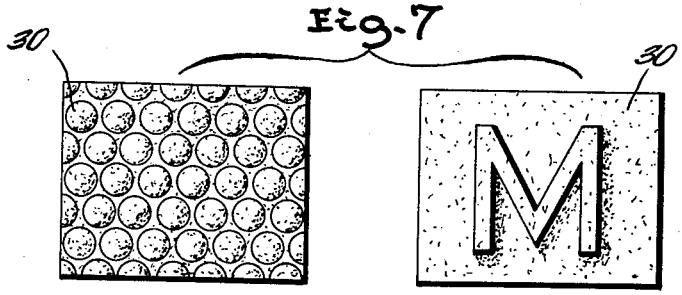
Figure 7 is a view of the product so produced.

I maintain this condition until the heat from the platens 29 has completed the vulcanization of the rubber, and the slab has been set, with its cellular structure and bulk selectively changed, re-formed into the shaped sheet 30, shown in Figure 7.

According to another form of my invention the shaped sheet has its faces in cut-section.

Figure 8:
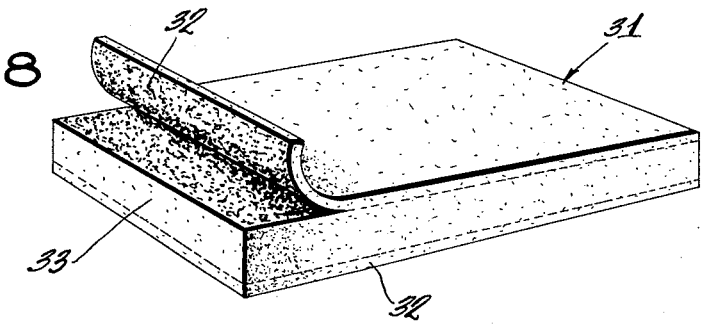
Figures 8 and 9 are views illustrating a first alternative form.
Figure 9:
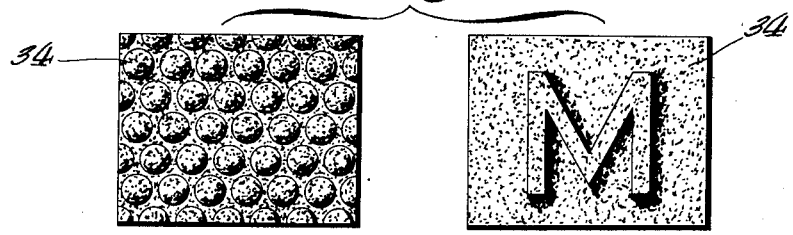

In such case I form a slab 31, as shown in Figure 8, similar to the slab 25, but of increased thickness, and then split from this slab 31 the two face layers 32, leaving the central section 33, and thereupon I form this central section 33, according to the process employed in connection with the slab 25, and obtain the shaped sheet 34, shown in Figure 9, and having both faces in cut-section, and shaped.

Figure 10:
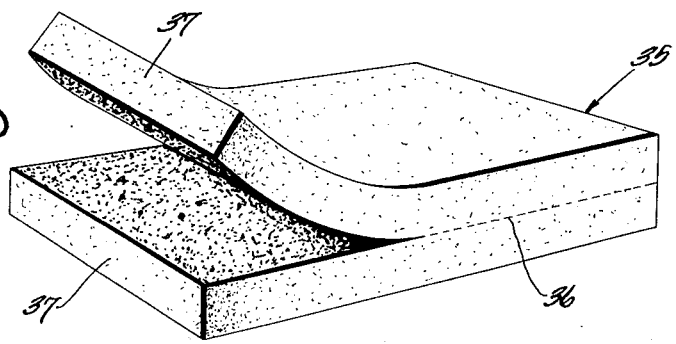
Figures 10 and 11 are views illustrating a second alternative form.
Figure 11:
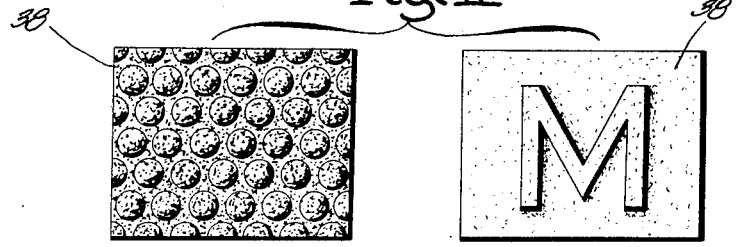

Under certain circumstances it is desirable that one face of the sheet be in cut section, as in the sheet 34, but that the other carry the skin or rind, as in the sheet 30. In such case I form a slab 35, as shown in Figure 10, double the thickness of the slab 25, and split this slab 35, along its median plane 36, into two halves 37, each of which is then processed, to produce the shaped sheet 38, shown in Figure 11.

I may shape only one side of the sheet, and in such cases I may omit the other mold plate 28, and employ the face of the corresponding press platen 29, as in the case of the mold 22. Under certain circumstances, as in forming relatively thin sheets shaped only on their faces, I may omit the mold frames 23 and 27, and use merely stops to limit the approach of the platens. On the other hand, I may shape the edges of the sheet, as well as the faces, as by suitably configuring the inner surfaces of the mold frame 27, and of course I may form the rubber sponge not only in the form of sheets, but in any other form that may be desired, and shaped over whatever part of the surface may be desired, merely by providing molds suitable to the purpose. I also may build up the sponge from a plurality of parts, as to secure additional thickness, or to secure diversity in different parts, as of color or texture, or to incorporate a stiffening section, as sheet rubber or the skin of the sponge.

However these things may be, I produce by my process shaped rubber sponge wherein the shaping is achieved by re-forming, by changing the cellular formation, to change the density without substantial re-distribution of material from one area to another. As exemplified in a sheet, the weight is substantially uniform over the entire area. I also produce a rubber sponge having a cut-section surface shaped, as distinguished from simulation of shaping by cutting away and removing parts of the material.

Obviously, however, the particular embodiments of my invention herein disclosed or suggested may be variously modified, without departing from the scope of my invention, or sacrificing the advantages thereof, and the herein disclosure is illustrative only, and my invention is not limited thereto.

I claim:

1. An integral body of rubber sponge, configured, and wherein the raised portions are of correspondingly lesser density than the depressed portions.

2. An integral body of rubber sponge, having a surface in cut-section and configured, and wherein the raised portions are of correspondingly lesser density than the depressed portions.

3. Rubber sponge sheet, having at least one face configured, and wherein the raised portions are of correspondingly lesser density than the depressed portions.

4. Rubber sponge sheet, having at least one face in cut-section and configured, and wherein the raised portions are of correspondingly lesser density than the depressed portions.

5. The process of producing configured rubber sponge, comprising: compounding the rubber with expanding agent and proceeding in the formation of rubber sponge until the expanding agent has at least largely expended itself; and thereafter changing the sponge density selectively, to produce different sponge densities at different places, to effect configuration of the sponge.

6. The process of producing configured rubber sponge, comprising: compounding the rubber with expanding agent and proceeding in the formation of rubber sponge, until the expanding agent has at least largely expended itself; removing material to present a surface in cut-section; and changing the sponge density selectively, to produce different sponge densities at different places, to effect configuration at least of said cut-section surface, and with said cut-section surface remaining in cut-section.

7. The process of producing configured rubber sponge, comprising: proceeding in the formation of rubber sponge until the rubber has attained cellular formation; and thereafter changing the sponge density selectively, to produce different sponge densities at different places, to effect configuration of the sponge.

8. The process of producing configured rubber sponge, comprising: proceeding in the formation of rubber sponge until the rubber has attained cellular formation; removing material to present a surface in cut-section; and changing the sponge density selectively, to produce different sponge densities at different places, to effect configuration at least of said cut-section surface, and with said cut-section remaining in cut-section.

VERNON L. MILLER.